United States Patent [19]

Yin

[11] Patent Number: 4,787,700
[45] Date of Patent: Nov. 29, 1988

[54] ATTENUATOR FOR SINGLE-MODE OPTICAL FIBERS AND PROCESS FOR ITS FABRICATION

[75] Inventor: Huan B. Yin, Paris, France

[73] Assignee: Radiall Industrie, Rosny-S/Bois, France

[21] Appl. No.: 50,621

[22] Filed: May 6, 1987

[30] Foreign Application Priority Data

May 15, 1986 [FR] France ................ 86 06991

[51] Int. Cl.[4] .............................................. G02B 6/38
[52] U.S. Cl. .................................................. 350/96.21
[58] Field of Search .............. 350/96.15, 96.18, 96.20, 350/96.21, 96.22

[56] References Cited

U.S. PATENT DOCUMENTS

| | | | |
|---|---|---|---|
| 3,982,815 | 9/1976 | Nakayama | 350/96.22 |
| 4,181,402 | 1/1980 | Borsuk et al. | 350/96.21 |
| 4,320,938 | 3/1982 | Gunnerson et al. | 350/96.21 |
| 4,330,171 | 5/1982 | Malsot et al. | 350/96.21 |
| 4,378,145 | 3/1983 | Stancati et al. | 350/96.21 |
| 4,389,091 | 6/1983 | Lidholt et al. | 350/96.20 |
| 4,681,398 | 7/1987 | Bailey et al. | 350/96.20 |
| 4,695,126 | 9/1987 | Cook | 350/96.21 |

FOREIGN PATENT DOCUMENTS

| | | | |
|---|---|---|---|
| 074499 | 8/1982 | European Pat. Off. | |
| 063085 | 9/1982 | European Pat. Off. | |
| 098205 | 6/1983 | European Pat. Off. | |
| 156075 | 12/1984 | European Pat. Off. | |
| 3042609 | 11/1980 | Fed. Rep. of Germany | |
| 3109996 | 9/1982 | Fed. Rep. of Germany | |
| 54-1647 | 1/1979 | Japan | |
| 53-59950 | 5/1979 | Japan | |
| 110204 | 8/1980 | Japan | 350/96.15 |
| 55-143514 | 11/1980 | Japan | |
| 57-40984 | 3/1982 | Japan | 350/96.1 |
| 55903 | 4/1983 | Japan | 350/96.15 |
| 64307 | 4/1985 | Japan | 350/96.15 |
| 60-133413 | 7/1985 | Japan | |
| 175007 | 9/1985 | Japan | 350/96.13 |
| 2058392 | 4/1981 | United Kingdom | |
| 2114769 | 8/1983 | United Kingdom | 350/96.21 |
| 2166885 | 5/1986 | United Kingdom | 350/96.15 |

OTHER PUBLICATIONS

Review of Electrical Comm. Laboratories, 418, vol. 27 (1979) Nov./Dec. No. 11-12; "Demountable Connectors for Optical Fiber Transmission Equipment".

Primary Examiner—William L. Sikes
Assistant Examiner—Frank González
Attorney, Agent, or Firm—Arnold, White & Durkee

[57] ABSTRACT

The invention relates to an attenuator for single-mode optical fibers entailing two male ferrules attached to the end of the fibers to be connected, and a female access coupler in the central part of which is a spherical thrust bearing body. A transverse axial orifice is provided in the thrust bearing body and a contact projection engages each of the male ferrules. Each male ferrule has an axial tubular protuberance that can be inserted into the orifice of the thrust bearing body and an annular groove set back from the protuberance and surrounding the back part of the latter, which groove has a wall, preferably conical in profile. The end (8) of the protuberance (6) of each of the male ferrules and the end of the corresponding immobilized fiber (7) inside said protuberance are tilted in relation to a plane perpendicular to the longitudinal axis of a ferrule; the male ferules (4) and the female access coupler (1) comprise corresponding indexing references (10, 11) that fix a predetermined angular orientation of the opposite optical fibers (7), and the axes of said fibers are offset from the optical axis of the attenuator by a fixed value.

4 Claims, 2 Drawing Sheets

ATTENUATOR FOR SINGLE-MODE OPTICAL FIBERS AND PROCESS FOR ITS FABRICATION

BACKGROUND

The present invention relates to an attenuator for single-mode optical fibers.

There is described, in EP-A No. 0063085, a connector for optical fibers that comprises two ferrules attached to the end of each of the fibers to be connected, and a female access coupler pierced lengthwise to support and align the two ferrules face to face. In the central part of the female coupler, inside its lengthwise pierced hole, is a thrust bearing body, particularly a sphere, for the male ferrules. The thrust bearing body has a transverse axial orifice and, around this, a contact projection opposite each of the male ferrules.

Each male ferrule has an axial tubular protuberance that can be inserted into the orifice of the thrust bearing body and a conduit into which the optical fiber can be introduced loosely and immobilized in such a way that its end coincides with the end of the protuberance. Each of the ferrules, moreover, has an annular groove set back from the protuberance and surrounding the back part of the latter. The wall of the groove, preferably conical in profile, defines a projection of contact with the projection opposite the thrust bearing body of the female coupler under the action of a longitudinal means of pressure. The projections opposite the body of the thrust bearing of the male ferrules are arranged in such a way that during any relative movement of the projections in contact with the end of a fiber at the level of the end of the protuberance of a male ferrule will remain at a predetermined, constant distance from the center of the thrust bearing body.

In order to obtain a certain attenuating function, the distance between the fiber ends in the male ferrules can be increased, for example, by increasing the diameter of the sphere that constitutes the thrust bearing body.

The connector described in the aforementioned European patent can thus constitute an attenuator for multimode optical fibers. It cannot, however, serve as an attenuator for single-mode optical fibers, because the distance between the fiber ends would be too great and would affect the characteristics of the transmitted field.

SUMMARY OF THE INVENTION

The present invention proposes to produce an attenuator for optical fibers that, while presenting the general characteristics of the connector of the aforementioned European patent, can be used for single-mode optical fibers by virtue of a predetermined or adjustable attenuating function.

The attenuator prepared according to the invention is characterized essentially by the fact that the end of the protuberance of each male ferrule, and the end of the corresponding fiber immobilized in said protuberance, are tilted in relation to a plane perpendicular to the longitudinal axis of the ferrule, preferably at an angle of between 10 and 14 degrees; the male ferrules and the female access coupler entail cooperating indexing references that determine a fixed angular orientation of the opposite optical fibers; and the axes of said fibers are offset from the optical axis of the attenuator by a fixed amount.

In a version producing a function of adjustable attenuation, at least one of the male ferrules is adjusted in rotation by means of a movable turning part of the female access coupler and a peripheral sleeve that immobilizes it at an angle determined by the relation to said coupler.

In order to produce an attenuator according to the invention, each of the ferrules is first prepared as follows.

A male ferrule into which a single-mode optical fiber has been positioned and immobilized, especially by gluing, is led into a gauge constituted by a thrust bearing piece in the form of the support projection of the thrust bearing body of the female access coupler. The ends of the fiber and of the ferrule protuberance are cut and polished perpendicular to the longitudinal axis of the ferrule at a predetermined distance from the center of the piece of thrust bearing of the gauge. Then, with the help of a sighting telescope, the fiber core is pierced and polished obliquely to the front of the ferrule protuberance and of the immobilized fiber inside it; this process is carried out in a second gauge constituted by a thrust bearing piece in the form of the support projection of the thrust bearing body of the female coupler. A final, precise adjustment is then made with the help of a sighting telescope so as to introduce a predetermined offset between the fiber axis and the optical axis of the telescope revealing the optical axis of the attenuator.

BRIEF DESCRIPTION OF THE DRAWINGS

Other advantages and characteristics of the invention will appear in the following description of an example of an application that refers to the attached figures, in which.

DETAILED DESCRIPTION

Figure 1:
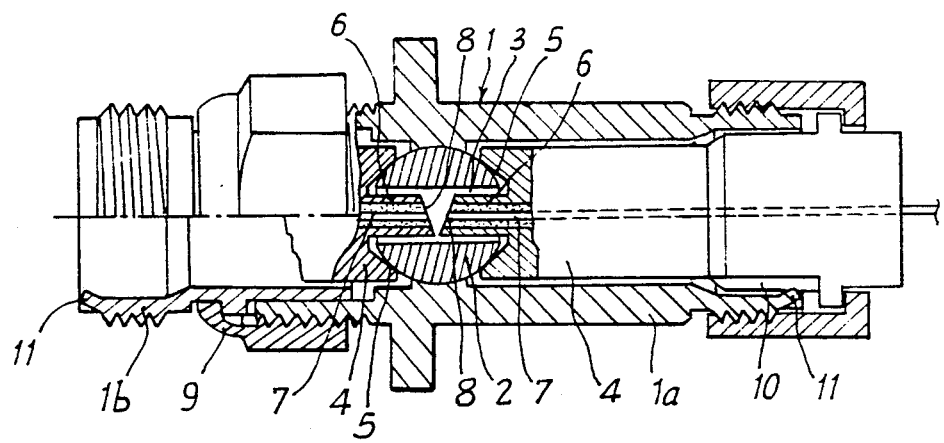
FIG. 1 is a partial view of an adjustable-type attenuator produced according to the invention.

The attenuator illustrated in FIG. 1 comprises the essential characteristics of the connector described in EP-A No. 0063085, which is incorporated herein by reference and which can be consulted for further details.

The attenuator entails, essentially, a female access coupler (1) inside of which is a fixed sphere (2) pierced lengthwise (3).

The attenuator entails two male ferrules (4), each with a conical projection (5) pressing against the sphere (2) and an axial protuberance (6) containing an immobilized optical fiber (7).

According to the invention, the front of the end (8) of each protuberance (6), and thus of the corresponding optical fiber, forms an angle, for example of 13 degrees, in relation to a plane perpendicular to the longitudinal axis of the attenuator.

In the version of the adjustable attenuator illustrated in FIG. 1, the coupler (1) has a stationary part (1a) and at least one movable part in rotation (1b). A peripheral sleeve (9) immobilizes the movable part (1b) in relation to the stationary part (1a) of the female access coupler (1) once the desired angular orientation has been attained.

As can be seen from FIGS. 1 and 2a-2c, corresponding indexing references are provided on the female access coupler (1) and on the male ferrules (4), for example in the form of grooves (10) on the ferrules (4) and ribs (11) on the access coupler.

Figure 2A:
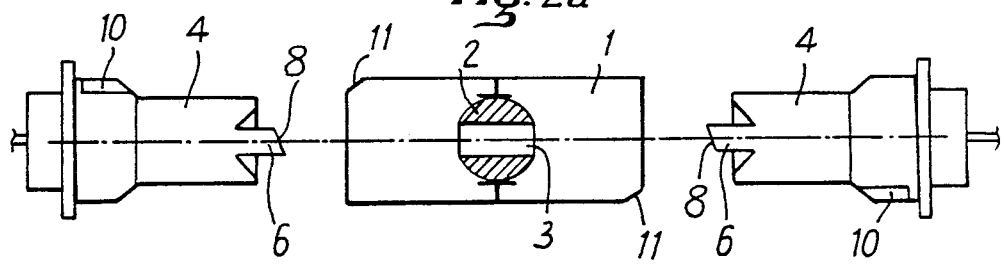
FIGS. 2a, 2b and 2c illustrate the relative positions of the male ferrules and the female access body of an attenuator produced according to the invention for different fixed attenuation values.

FIG. 2a illustrates a relative position of the ferrules and the coupler where the ends (8) are parallel. This position corresponds to the attenuation minimum, on the order of 0.5 dB.

Figure 2B:
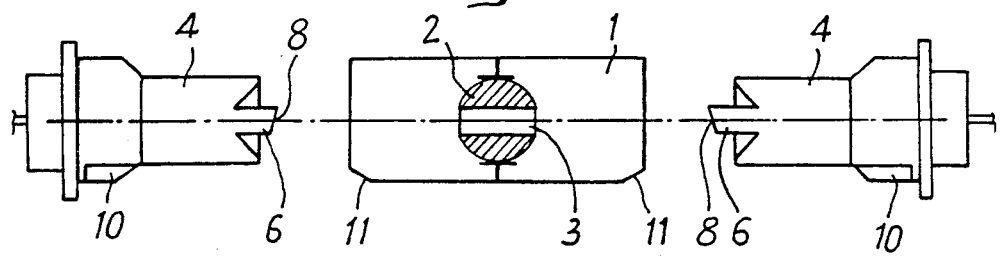
Figure 2C:
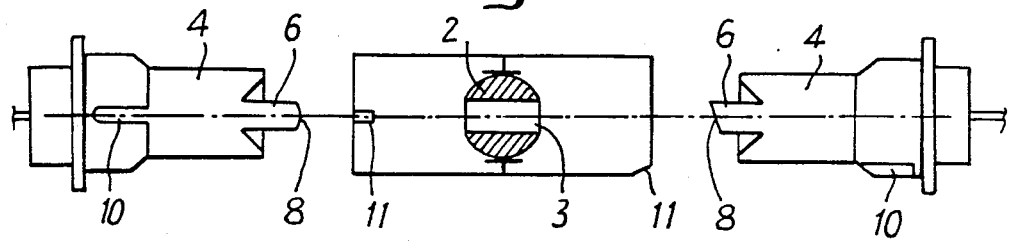
Figure 3:
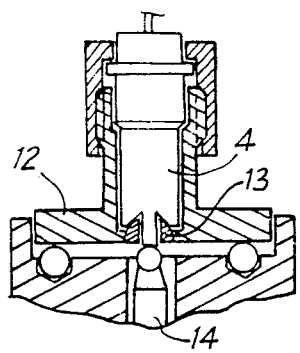
FIGS. 3 through 6 are schematic views illustrating the different successive phases of adjustment of a ferrule.

FIGS. 1 and 2b illustrate the position of maximum attentuation, around 20 dB, whereas FIG. 2c illustrates a position of intermediate attentuation, around 10 dB.

Regarding FIGS. 3 through 8, we will describe the process of production and adjustment of a ferrule for producing the attentuator according to the invention and corresponding to minimal attenuation.

A ferrule (4) is placed in the right polishing gauge (12), which comprises a thrust bearing element (13) in the form of a hemisphere with the dimensions of the sphere (2) of the female access coupler.

The level of polishing is assessed with a comparator (14) previously calibrated with a standard ferrule. (The exact position of the front of the ferrule in relation t the center of the hemisphere is known.)

Polishing is carried out in such a way that the front of the ferrule protuberance would be at a distance of 4 to 7 $\mu$m from the center of sphere (2) if the corresponding ferrule were placed over the sphere.

Figure 4:
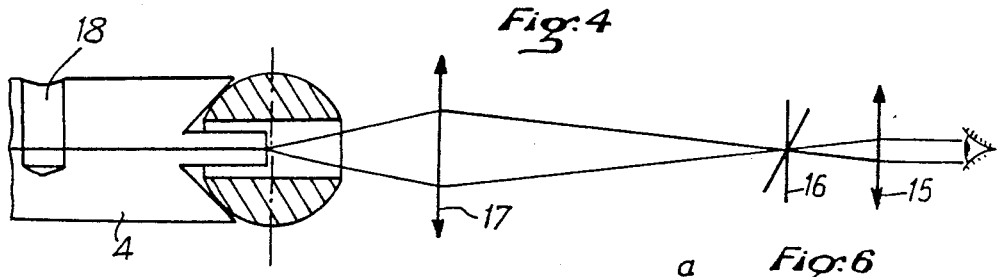
Figure 5:
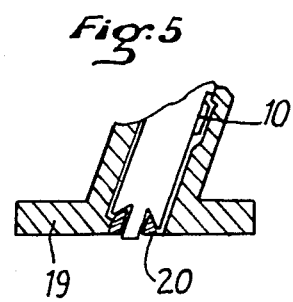

The fiber core is then pierced in relation to the center of the sphere, as illustrated in FIG. 4.

This requires the use of a sighting telescope equipped with an eyepiece (15) containing a reticule in the form of a crossbar (16) and a lens (17). A white light is shone through a radial hole (18) in the ferrule (4) to illuminate the fiber in the ferrule opposite the telescope, whose lens (17) is focused on the front side of the previously polished fiber. The center of the crossbar of the reticule (16) is preadjusted to visualize the center of the sphere. Then adjustment is made until the center of the core of the illuminated fiber coincides with the center of the crossbar of the reticule. The front of the fiber is then at a distance of, for example, 6 $\mu$m from the center of the sphere.

The end of the protuberance of the ferrule, and therefore that of the fiber are then polished obliquely using an oblique polishing gauge (19) (FIG. 5), which comprises a thrust bearing piece (20) in the form of the support projection of the sphere (2). The level of polishing is assessed with a comparator (not shown) previously calibrated with a standard ferrule with an oblique end, whose exact height in relation to the center of the piece of thrust bearing is known.

Figure 6:
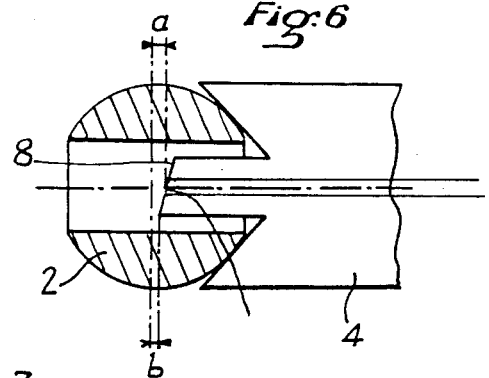

FIG. 6 illustrates the ferrule (4) produced in this manner pressed against the sphere (2). The distance a, measured on the axis (21) of the fiber (7) between its end and the center of the sphere, is, for example, 13 to 15 $\mu$m; distance b is, for example, 4 to 7 $\mu$m.

After this polishing phase, final adjustment is made of the ferrule with the telescope, as illustrated in FIG. 4, in order to reduce connection losses.

Figure 7:
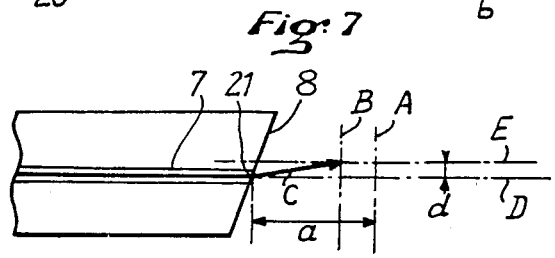
FIG. 7 illustrates the end of a fiber during the final adjustment phase.

In FIG. 7, A shows the axis of the sphere, B the focal plane of the telescope, and C the beam actually deviating from the tilt of the side (8).

Adjustment is made in such a way that real fiber axis D is offset by value d from the optical axis E of the telescope, which reveals the optical axis of the attentuator.

Figure 8:
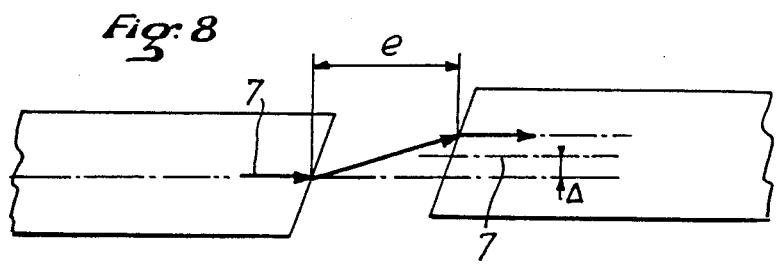
FIG. 8 illustrates the relative positions of two opposite single mode optical fibers in the attenuator produced according to the invention.

After this operation has been carried out on both ferrules of an attenuator, the fibers are in the position illustrated in FIG. 8. Each one is offset d from the optical axis, that is, there is a total offset of $\Delta = 2d$ between the real axes of the two opposite fibers.

The deviation of the beam represented in FIG. 8 will be partially compensated.

At a distance e of, for example, 20 $\mu$m between the fiber ends, with a 12-degree tilt angle of the fiber ends and an offset $\Delta$ of 0.8 $\mu$m, a connection loss of only 0.25 dB is obtained, whereas if the fibers were aligned in a fashion mechanically perfect, this loss would be 0.7 dB.

In practice, the axial distance e between the fiber ends should always be large enough to permit relative rotation of the two fibers without any contact between them.

Although the invention has been described in connection with a preferred method of application, it is quite evident that it is in no way limited to that application, and that numerous variants and modifications can be applied to it without going beyond its framework or its spirit.

I claim:

1. An attenuator for single-mode optical fibers comprising:
   two male ferrules each having an axial protuberance with a conduit passing through the protuberance and ferrule into which an optical fiber is positioned and immobilized so that its end coincides with the end of the axial protuberance, each of the ferrules further having a conical groove set back from and surrounding the axial protuberance;
   a female access coupler having in a central part thereof a generally spherical thrust bearing body to support aligned male ferrules face to face, said body having a transverse axial orifice for receiving the axial protuberances of the male ferrules and having contact projections for engaging the grooves in the male ferrules under the action of a longitudinal means of pressure;
   wherein the end of the protuberance of each of the male ferrules and the end of the immobilized optical fiber are tilted in relation to a plane perpendicular to the longitudinal axis of the ferrule; and
   wherein the male ferrule and female access coupling include corresponding indexing references that determine a fixed angular orientation of the optical fibers; and
   wherein the axes of said fibers are offset from the optical axis of the attenuator by a fixed amount.

2. An attenuator according to claim 1 characterized by the fact that the tilt angle of the end of the protuberance of each of the male ferrules and of the corresponding fiber end is between 10 and 14 degrees in relation to a plane perpendicular to the longitudinal axis of the ferrule.

3. An attenuator according to claim 1 or claim 2 characterized by the fact that the female access coupler comprises one stationary part and at least one movable part with a peripheral sleeve for immobilizing the moveable part in relation to the stationary part in a determined angular position.

4. A process for producing an attenuator for single-mode optical fibers having a female access coupler and two male ferrules, said process comprising:

placing a male ferrule into which a single-mode optical fiber has been immobilized into a gauge comprising a portion of a thrust bearing corresponding to a thrust bearing in the female coupler;

cutting and polishing the end of the fiber and ferrule in a plane perpendicular to the longitudinal axis of the ferrule at a predetermined distance from the center of the portion of the thrust bearing of the gauge;

placing the male ferrule in a second gauge;

piercing and polishing the fiber and protuberance obliquely to the front of the ferrule; and introducing a predetermined offset between the axis of the fiber and optical axis of the attenuator.

* * * * *